United States Patent [19]

Brinkers

[11] Patent Number: 4,880,285

[45] Date of Patent: Nov. 14, 1989

[54] COLLAPSIBLE SUPPORTING DEVICE FOR SUPPORTING A VERTICALLY ADJUSTABLE LIFTING PLATFORM IN A DISPLAY CONTAINER, AND DISPLAY CONTAINER PROVIDED WITH SUCH A DEVICE

[76] Inventor: Gerardus C. Brinkers, Duinvoetlaan 20, 2243 CL Wassenaar, Netherlands

[21] Appl. No.: 62,507

[22] Filed: Jun. 12, 1987

[30] Foreign Application Priority Data

Jun. 12, 1986 [NL] Netherlands ........................ 8601528
Sep. 11, 1986 [NL] Netherlands ........................ 8602296
Dec. 23, 1986 [NL] Netherlands ........................ 8603281

[51] Int. Cl.$^4$ ............................................. A47B 51/00
[52] U.S. Cl. .................................... 312/312; 108/147; 248/173
[58] Field of Search ............... 312/312, 306; 248/172, 248/173, 434; 211/59.2, 59.3; 108/144, 147

[56] References Cited

U.S. PATENT DOCUMENTS

| | | | |
|---|---|---|---|
| 427,982 | 5/1890 | Gifford | 312/312 |
| 950,340 | 2/1910 | Ott | 248/173 |
| 971,921 | 10/1910 | Nugent | 248/172 |
| 2,805,776 | 9/1957 | Levitin | 248/172 X |
| 2,909,400 | 10/1959 | Johnston et al. | 248/172 |
| 3,361,510 | 1/1968 | McDermott | 313/306 X |
| 3,926,001 | 12/1975 | Webb | 312/306 X |
| 4,700,731 | 10/1987 | Smith | 248/434 X |

Primary Examiner—Peter A. Aschenbrenner
Assistant Examiner—Thomas A. Rendos
Attorney, Agent, or Firm—Lucas & Just

[57] ABSTRACT

A supporting device for supporting a vertically adjustable lifting platform in a container for the transportation, temporary storage and display and presentation of products such as packed foods, the lifting platform being adapted for carrying the products, comprises a lifting device for the vertical displacement of the lifting platform and is designed as a loose unit to be placed inside a casing forming the container. Preferably, the supporting device is designed so that it is folding or collapsible. The supporting device comprises a supporting bar for directly supporting the lifting platform. The supporting bar may be hingedly connected to the lifting device. Also, the supporting bar may have hingedly attached side leaves which together with the supporting bar form the lifting platform.

13 Claims, 9 Drawing Sheets

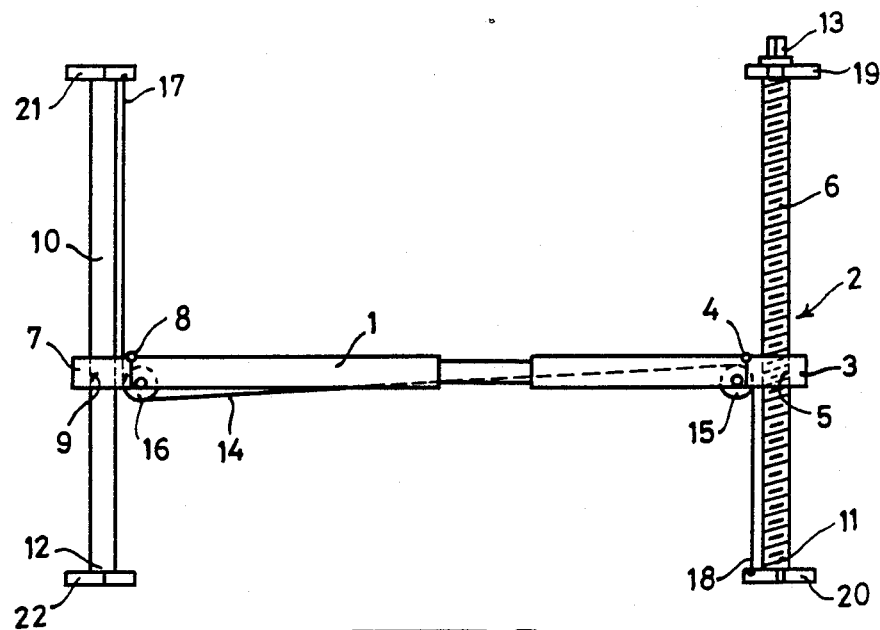
FIG:1.
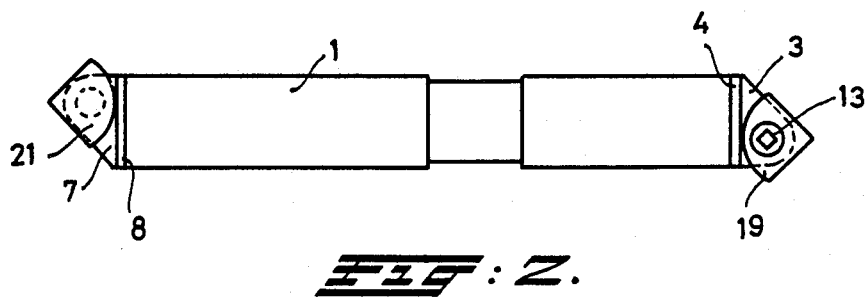
FIG:2.
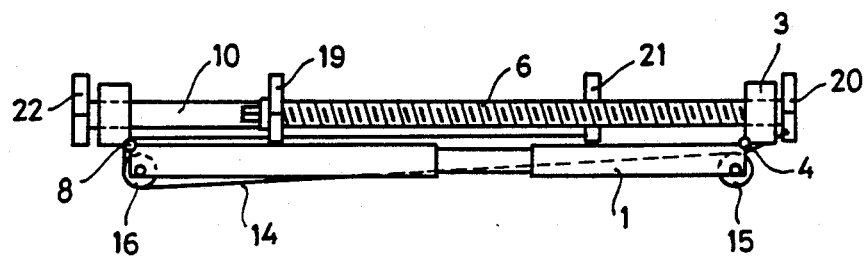
FIG:3.

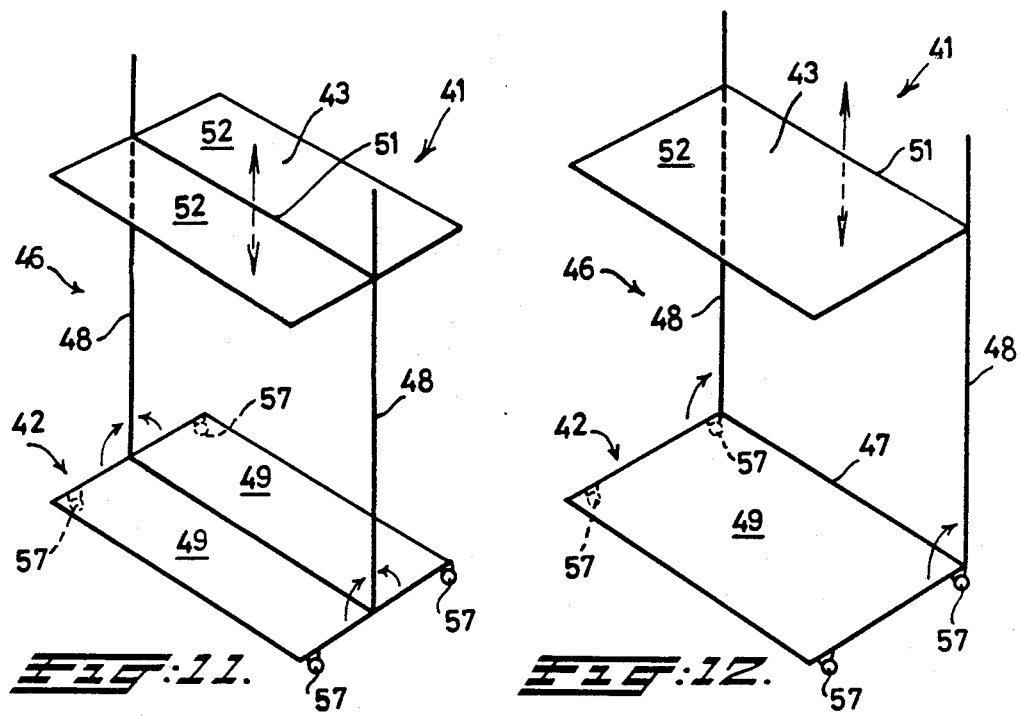
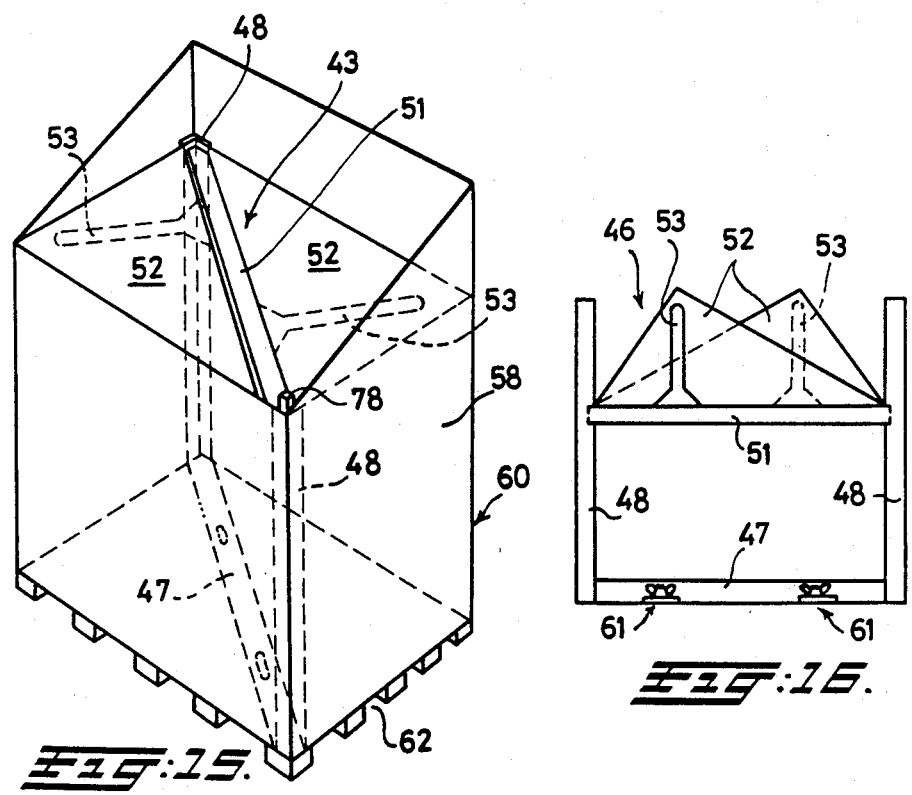

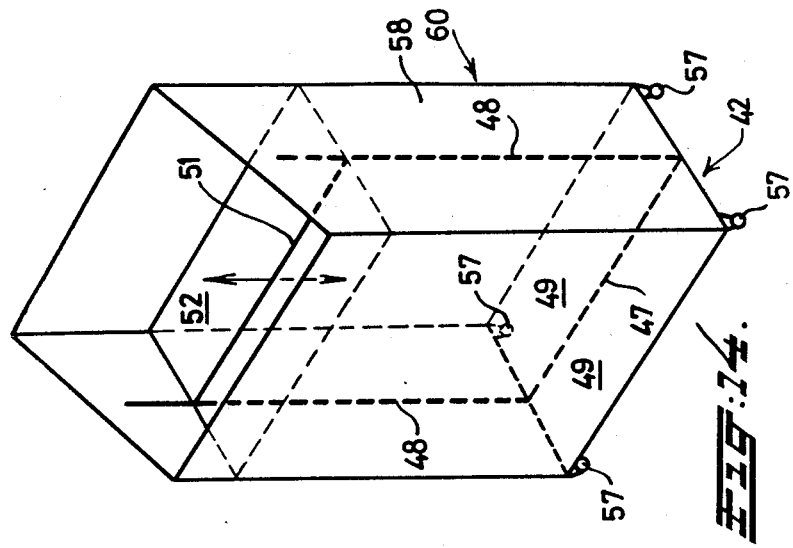
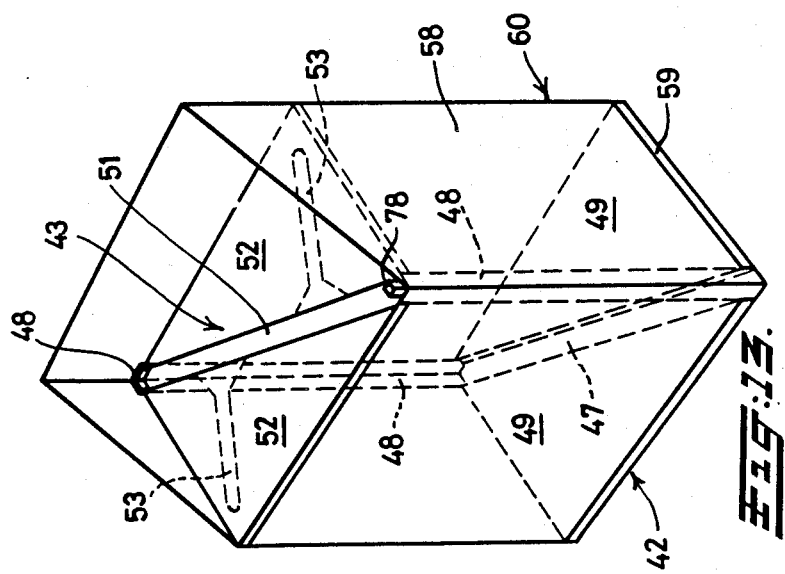

COLLAPSIBLE SUPPORTING DEVICE FOR SUPPORTING A VERTICALLY ADJUSTABLE LIFTING PLATFORM IN A DISPLAY CONTAINER, AND DISPLAY CONTAINER PROVIDED WITH SUCH A DEVICE

BACKGROUND OF THE INVENTION

The invention relates to a supporting device for supporting a vertically adjustable lifting platform in a container for the transportation, temporary storage and display and presentation of products such as packed foods, the lifting platform being adapted for carrying the products, said supporting device at least comprising a lifting device for the vertical displacement of the lifting platform.

Such a device is known from, for example European patent specification No. 63,121. This European patent specification discloses a particular embodiment of a pallet container (also called a display container or promotion container), which consists of a prismatic casing with vertical ribs which is open at the top or can be opened, and is provided on the inside with a lifting platform fitting inside the casing for the purpose of carrying the products. The lifting device is here placed outside the actual container, in order to ensure that the capacity of the container, can be used as much as possible for the storage of the products. The lifting device essentially comprises a vertical threaded rod, fitted with a nut which is provided with a transversely projecting lip which projects through the wall of the container and supports the lifting platform. The lifting platform is held in the horizontal position by means of two inextensible belts which are both passed underneath the lifting platform, and one end of which is fastened at the bottom of the container, while the other end is fastened at the top of the container. The casing can be made of cardboard plywood, plastic, chipboard or even wood.

The use of such a container with lifting device results in a considerable saving as regards labor and packing material. For the container can be loaded entirely or virtually entirely automatically in the factory, and the products are then offered to the public in the shop or supermarket without further handling. Both the repacking of the products which normally takes place in distribution centers and the placing of the products on the shelves of the shop become completely unnecessary. However, users of this type of container with lifting device find that a large amount of space is taken up for returning the container to the factory, which constitutes an inefficient link in the container cycle. This is partly due to the fact that the device for supporting the vertically adjustable lifting platform and the container are integral. It would be possible in principle to dismantle the device for supporting the lifting platform and the container and return the loose parts to the factory. This is not, however, a practical solution, since dismantling and reassembling in the factory take a long time. Besides, parts can be lost.

SUMMARY OF THE INVENTION

The object of the invention is then to find a solution to the above-mentioned problem and to produce a considerable volume reduction in the return delivery without extensive dismantling work This object is achieved in that the supporting device according to the present invention is designed as a separate unit to be placed inside a casing forming the container.

Such a separate unit can be placed inside a casing before filling of the container. When the container is empty, the unit can be removed. Several units can be placed closely next to or inside each other so that the return volume is much smaller than in case where complete containers are returned.

The casing can be collapsed to a flat pack and also returned to the factory or can be thrown away. For refilling the container, the supporting device can be placed again in a new casing.

Preferably the supporting device is designed so that it folds or is collapsible. Thus, after being removed from the casing and before return to the factory the supporting device can be folded or collapsed to a flat construction. In this way the volume of the return delivery is reduced to a minimum. Before being placed inside a new casing, the supporting device is unfolded again.

In a particularly preferred embodiment, the supporting device according to the present invention further comprises a supporting bar for directly supporting the lifting platform, said bar being hingedly connected to the lifting device in such a way that the lifting device and the supporting bar can be folded against each other.

Another preferred embodiment of the supporting device further comprises a base member and the base member, the lifting platform and the lifting device are combined to one lifting unit.

Expediently the lifting platform is designed so that it is foldable or collapsible.

In a further preferred embodiment, the base member forms part of a base of the supporting device, the base being designed so that it is foldable or collapsible.

Further embodiments of the supporting device according to the invention are claimed in the appended claims and described in the following description.

The invention further relates to a combination of a supporting device according to the invention and a casing which fits around said supporting device, which combination constitutes a display container.

Hereafter the invention will be explained in greater detail with reference to the drawings, in which a number of embodiments of the device according to the invention are illustrated.

BRIEF DESCRIPTION OF THE DRAWINGS

FIG. 1 shows schematically in side view a first embodiment of a supporting device according to the invention, in the opened-out state;

FIG. 2 shows a top view of the device of FIG. 1;

FIG. 3 shows the device of FIG. 1 in the collapsed state;

FIG. 9 to 12 show very schematically in perspective a number of possible variants of the supporting device according to the invention with folding or collapsible lifting platform and base;

FIG. 13 shows schematically a container formed by the supporting device according to FIG. 7 and a casing fitting around it;

FIG. 14 shows schematically a container formed by the supporting device of FIG. 10 with a casing fitting around it;

FIG. 15 shows schematically a container formed by still another embodiment of the supporting device according to the invention with a folding or collapsible lifting platform and a casing fitting around it;

FIG. 18 shows another lifting device consisting of an elastically extensible belt used in the embodiment of the supporting device according to the invention shown in FIGS. 7 to 16;

DETAILED DESCRIPTION OF THE PREFERRED EMBODIMENTS

Figure 4:
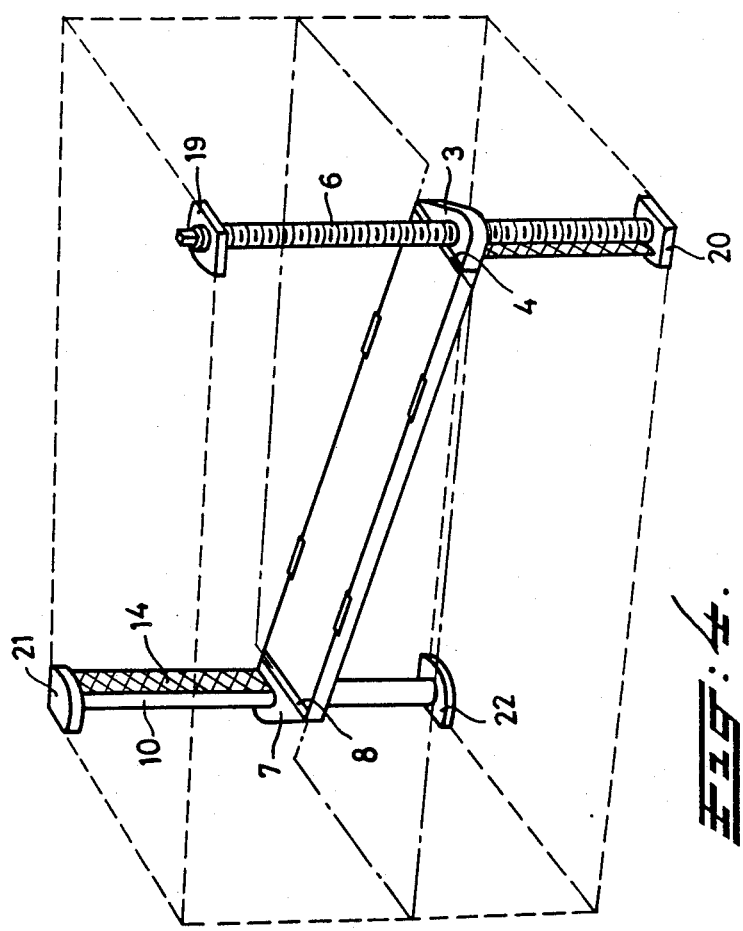
FIG. 4 shows in perspective the device of FIG. 1, with the inside contours of a casing forming a container in which the lifting unit is placed being shown by dotted lines.

The figures show various embodiments of the supporting device according to the invention which can be used with a container for the transportation, temporary storage and also for the display and presentation of products such as packed foods. Such a container is used particularly in shops, where products such a packed sugar, milk, yogurt, jam, peanut butter, salad dressing and the like are offered to the consumer in a clearly visible display and within easy reach. The dimensions of such a container are usually 40×60×80 cm. In such a display container the products are stacked in layers on a lifting platform, and when the stock goes down the lifting platform can move upwards to take the products offered within easy reach again. The supporting and vertical movement of the lifting platform take place by means of a lifting device which can be designed in various ways.

The supporting device shown in FIGS. 1 to 4 for supporting a vertically adjustable lifting platform in a container essentially comprises a supporting bar 1 for directly supporting the lifting platform and a lifting device 2 hingedly connected to said supporting bar for vertical displacement of the supporting bar. The supporting bar 1 is provided at one of its ends with an end part 3 which by means of a hinge 4 is hingedly connected to the supporting bar. The end part 3 is provided with a screw hole 5 which accommodates a threaded rod 6. Through turning of the treaded rod the end part 3, and with it also the supporting bar 1, can be moved in the lengthwise direction of the threaded rod 6, thus in FIG. 1 in the vertical direction. At its other end the supporting bar 1 is provided with a second end part 7 which by means of a hinge 8 is hingedly connected to the supporting bar 1. The end part 7 is provided with a through hole 9 in which a guide rod 10 is accommodated in sliding fashion.

The supporting device designed in this way as a loose lifting unit can be placed in a casing forming a container, for example a box, with the threaded rod 6 and the guide rod 10 being placed in two opposite corners of the container. The treaded rod 6 and guide rod 10 thereby rest with their bottom ends 11 and 12 respectively on the bottom of the container. The supporting bar can be moved up and down by turning the threaded rod 6. For turning the threaded rod 6, the latter is provided on its top side with a coupling element 13 on which a key, crank handle or hand-drill can be set.

In order to ensure that the supporting bar 1 is always held in the horizontal position, the lifting unit is provided with an inextensible belt or cable 14 which runs through under the supporting bar 1 and is conveyed over two rollers 15 and 16. One end 17 of the belt or cable 14 is connected to the top end of the guide rod 10. The other end 18 of the belt or cable 14 is connected to the bottom end of the threaded rod 6.

For the positioning of the lifting unit in a container and supporting it in the horizontal direction, the threaded rod 6 and the guide rod 10 are provided at their ends with plates 19, 20, 21, 22 which are disposed essentially at right angles to the axis of the rods. The plates are designed to rest sideways against the inside of the upright walls of the container. The shape of the outer periphery of the plates 19 to 22 is to that end adapted to the shape of the inside wall parts of the container against which the plates rest. The illustrated embodiment of the supporting device according to the invention is intended for placing diagonally in a rectangular container. The end plates 19 to 22 are therefore provided with corner parts which fit into the corners of the container.

In order to ensure that the same supporting device can be used in containers of differing dimensions, the supporting bar 1 can be made adjustable in length. The length of the supporting bar can then be adapted to the length of the diagonal of the container. It will be clear that when the length of the supporting bar is varied the effective length of the belt or cable 14 must be adapted. This can be achieved by, for example, designing one of the fastening points of the ends of the belt or cable with a detachable clamp by means of which the effective length of the belt can be made the same as the required length.

For transportation, the supporting device can be collapsed as shown in FIG. 3. The end parts 3 and 7 of the supporting bar are turned through 90 degrees in such a way that the threaded rod 6 and the guide rod 10 come to rest against the supporting bar 1. When collapsed, the supporting device takes up little space and can easily be returned to the factory. The casing in which the supporting device was placed can be returned separately to the factory, or can be thrown away.

FIG. 4 shows schematically the way in which a supporting device according to the invention can be placed in a rectangular casing forming a container (indicated by doted lines). It can be seen clearly that the end plates 19 to 22 are resting in the opposite corners of the container against the inside wall of the container. Fitting a supporting device in a container in this way means that little useful space is lost.

The lifting platform can be placed on the supporting bar 1 once the supporting device has been placed in the container. In order to ensure a stable positioning of the lifting platform on the supporting bar, the supporting bar can be provided, for example, with arms (not shown here) which can be flapped out to the side. It is, however, also possible for the lifting platform to be formed by the supporting bar 1 and two side leaves (in FIG. 4 shown by dotted and dashed lines) fixed hingedly on either side of the supporting bar 1.

Figure 5:
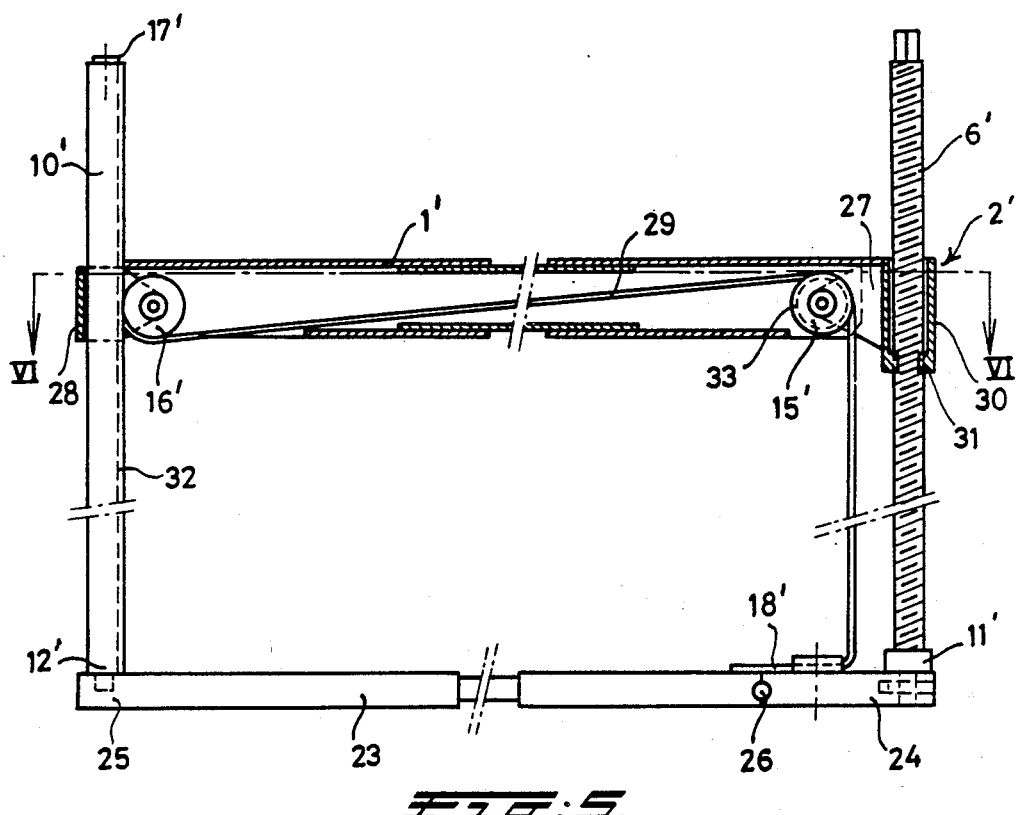
FIG. 5 shows a side view of another embodiment of a supporting device according to the invention, in the opened-out state.
Figure 6:
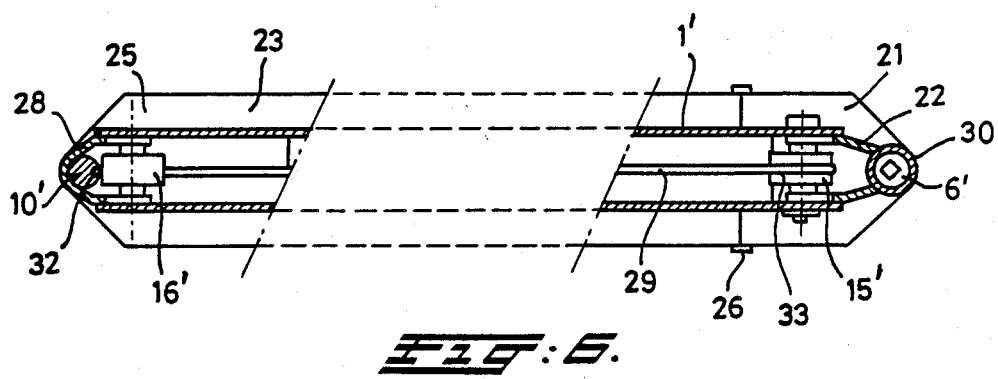
FIG. 6 shows a top view of the device of FIG. 5 along the line VI—VI.

FIGS. 5 and 6 show another possible embodiment of the supporting device according to the invention. In FIGS. 5 and 6 the parts of the supporting device shown which correspond to similar parts of the supporting device of FIG. 1 are indicated by the same reference numbers, but provided with an apostrophe.

The ends 11' and 12' of the threaded rod 6' and the guide rod 10' are coupled to the end parts 24 and 25 respectively of an oblong-shaped bottom plate 23 whose length corresponds essentially to the length of the supporting bar 1'. This bottom plate 23 is intended for placing on the bottom of the container.

In the embodiment shown the end part 24 of the bottom plate 23 is hingedly connected by means of a hinge 26 to the remainder of the bottom plate. The 11' of the threaded rod 6' is connected to the end part 24 in a fashion which may or may not be detachable. The threaded rod 6' is thereby always rotatably supported in the end part 24. The end 12' of the guide rod 10' is detachably coupled to the other end part 25 of the bottom plate 23.

It will be clear that it is also possible to turn the bottom plate 23 through 180 degrees, so that the hinged end part 24 comes to rest at the guide rod 10'.

The supporting bar 1' is provided with end parts 27 and 28 which are hingedly connected to the supporting bar 1'. The hinge pins of the end parts 27 and 28 coincide with the spindles of the rollers 15' and 16' which are supported in the supporting bar and over which a cable 29 is conveyed to hold the supporting bar horizontal, in the same way as in the embodiment described earlier.

The end part 27 is provided with a bush 30 through which the threaded rod 6' is passed. The bush 30 is firmly connected to a nut 31 which is provided on one end of the bush and mates with the threaded rod 6', so that by turning the threaded rod 6' the end part 27 and thereafter the whole supporting bar 1' can be moved up and down.

The end part 28 comprises a U-shaped part which engages with the guide rod 10'. The roller 16' rests against the guide rod 10'.

The cable 29 for holding the supporting bar 1' horizontal is connected by its one end 17' to the top end of the guide rod 10'. The cable 29 runs from there through a groove 32 disposed lengthwise in the guide rod 10', and then over the roller 16', through a peripheral groove 33 in the roller 15' to the end part 24 of the bottom plate 23. The end 18' of the cable 29 is fastened adjustable in the lengthwise direction of the bottom plate to the end part 24 of the bottom plate. This makes it possible to adapt the effective length of the cable 29 to the length of the supporting bar 1' and the bottom plate 23, which are adjustable in length in the embodiment of the supporting device shown in FIGS. 5 and 6.

The supporting device according to FIGS. 5 and 6 can be collapsed simply by detaching the coupling between the end 12' of the guide rod 10' from the bottom plate 23 and folding up the threaded rod 6', the guide rod 10' and also the bottom plate 23 against the supporting bar 1'.

The supporting bar will preferably be designed as a U-shaped section or a hollow tube, so that with relatively low weight great rigidity is still obtained. In addition, it creates the possibility of largely concealing the belt or cable 14, 29 in the supporting bar.

In a variant of the embodiment of FIGS. 5 and 6 it would be possible to connect also the bottom plate 23 hingedly to the threaded rod 6' and the guide rod 10' and to provide both the supporting bar 1' and the bottom plate 23 in the middle region with a hinge, such that the supporting bar 1' and the bottom plate 23 can be folded itself.

The embodiments shown in FIGS. 7 to 12 of the supporting device generally indicated by 41 comprise a base 42, and a lifting platform 43 which is vertically adjustable relative to said base. The platform 43 rests on a lifting device, a number of variants of which are shown in FIGS. 18 to 22. The platform also mates with an element for keeping the platform always in a horizontal position: a "flat-holder".

Figure 7:
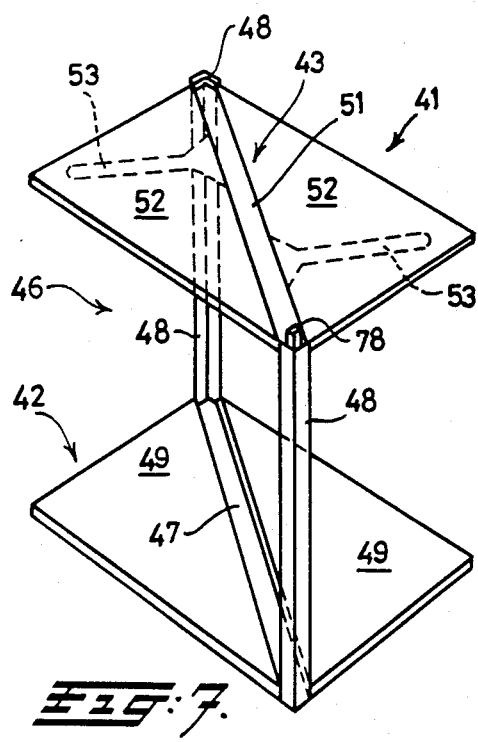
FIG. 7 shows schematically in perspective still another embodiment of the supporting device according to the invention with folding or collapsible lifting platform and base, the lifting platform being in the top position.

The base 42, the lifting platform 43 and the lifting device 44 are combined to one transportation and lifting unit 46 which is made folding or collapsible. In particular, both the lifting platform 43 and the base 42 are made folding or collapsible. The transportation and lifting unit consists of a U-shaped frame with a central part 47, e.g. in the form of a U-bar, and two upright legs 48. The collapsible parts of the base 42 are hingedly connected to the horizontal central part 47 of the frame. In the embodiment of FIG. 7 the folding or collapsible parts of the base are side leaves 49 which hinge about axes running parallel to the central part 47 of the frame and which in the folded-out position form a pallet. The lifting platform 43 is designed as a supporting bar 51 extending between the two legs and having hingedly fastened side leaves 52. The side leaves 52 are each also carried by a bracket 53 which ensures a limitation of the hinged movement of the side leaves 52 to the horizontal position. The supporting bar 51 is connected at one end to the lifting device 44 yet to be described and mates with the flat-holder 45, also yet to be described.

Figure 8:
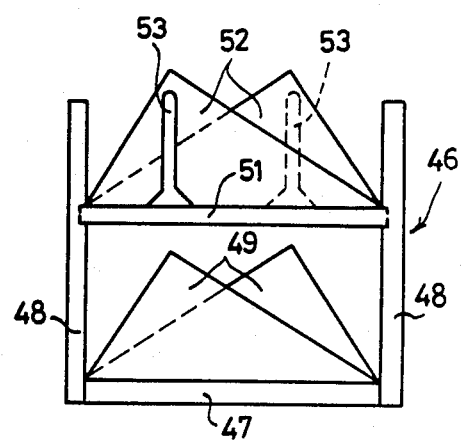
FIG. 8 shows on a smaller scale the supporting device of FIG. 7 in the collapsed state.

FIG. 8 shows the supporting device of FIG. 7 in the collapsed state, in which both the side leaves 52 of the lifting platform 43 and the side leaves 49 of the base 42 are flapped up and rest against each other. In this state the supporting device takes up little space and can easily be transported.

Figure 9:
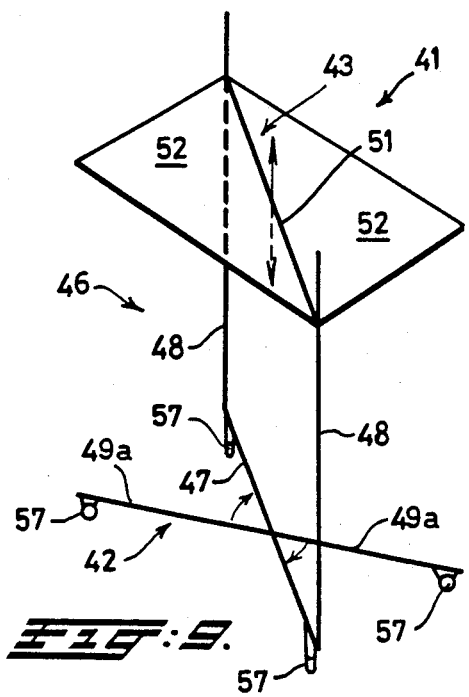
Figure 10:
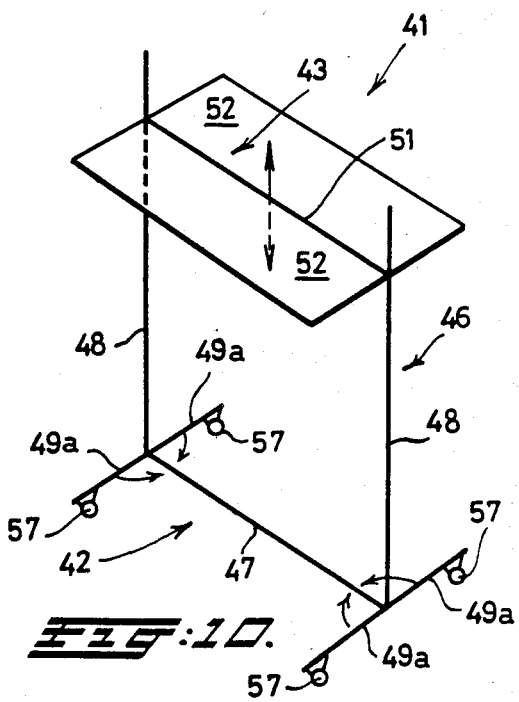

FIGS. 9 and 10 show two other possible variants of the supporting device according to the invention, in which the folding or collapsible parts of the base 42 consist of arms 49a hingedly fastened to the frame near the central part 47. In the variant according to FIG. 9 the hinge point of the arms 49a is near the centre of the central part 47, while in the variant according to FIG. 10 the hinge points of the arms 49a are near the ends of the central part 47. In both cases the arms 49a can be folded in the direction of the arrows against the central part 47. It is pointed out that in the variant according to FIG. 9 de central part of the frame and the carrying bar 51 form a diagonal of the base 42 and the lifting platform 43. In the variant according to FIG. 10 the central part 47 of the frame and the carrying bar 51 coincide with the longitudinal axis of the base 42 and the lifting platform 43.

The variant of the supporting device according to FIG. 11 corresponds to that of FIG. 10, with the difference that the collapsible parts of the base 42 consist of side leaves 49 which hinge about axes running parallel to the central part 47 of the frame and which—as in the embodiment according to FIG. 7—form a pallet when opened out. Like the side leaves 52 of the lifting platform 43, the side leaves 49 of the base 42 can be flapped up.

In the variant of the supporting device according to FIG. 12 the base 42 has only one collapsible side leaf 49 which is fastened to the frame to hinge about an axis running parallel to the central part 47 of the frame. The lifting platform 43 also has only one side leaf 52 hingedly fastened to the carrying bar 51.

In all variants of the supporting device according to the invention shown in FIGS. 7 to 12 the vase is expediently provided with means for fixing the folding or collapsible parts of the base relative to the frame. Moreover, in the variants according to FIGS. 9 to 12 the side leaves 52 of the lifting platform can each be carried by a bracket, in the same way as shown in FIG. 7.

The base 42 can also be provided with wheels 57, as indicated, for example, in FIGS. 9 to 12. This makes it easy for a container in which the supporting device according to the invention is used to be transported.

Figure 19A:
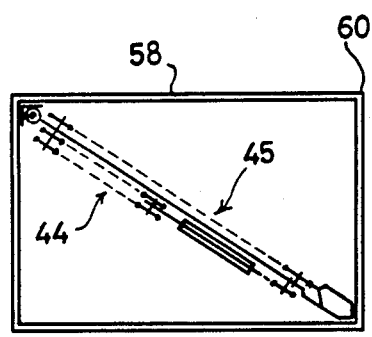
FIG. 19A and 19B show a top view and side view respectively of a variant of the lifting device according to FIG. 18.

FIG. 13 shows a container consisting of the supporting device according to FIG. 7 and a casing 58 which fits around this carrying device and with its lower edge 59 rests on the base 42, in particular on the side edges of the side leaves 49. The casing 58 is also held in shape by the base 42. The casing 58 is prismatically designed and has vertical ribs 60. The upright legs 48 of the U-shaped frame fit against the inside of diagonally situated ribs of the casing 58. The legs 48 thereto have a horizontal sectional profile which butts against the ribs involved. As shown in FIGS. 13 and 19A, the two flanges of each angle ion 48 from an angle deviating from 45 degrees with the supporting bar 51. This is due to the rectangular (and thus not square) sectional shape of the casing 58. It is pointed out that in the event of use of a hexagonal cover the flanges of the angle ion 48 will form an angle of 120 degrees, while the supporting bar 51 forms an angle of 60 degrees with each flange.

FIG. 14 shows a container which consists of the supporting device of FIG. 10 and a casing 58 fitting around said supporting device. This casing 58 is also supported and held in shape by the base 42.

The casing can be fitted around the supporting device in a very simple manner in order to form a container which has to be filled. When the container is empty again, the cover can very easily be removed and the carrying device folded together.

FIG. 15 shows a container formed by another embodiment of the supporting device according to the invention and a casing fitted around it. The embodiment of the supporting device shown in FIG. 15 is similar to the embodiment of FIG. 7, except that it has no base like the embodiment of FIG. 7.

The embodiment of FIG. 15 also comprises a U-shaped frame with a central part 47, e.g. in the form of a U-bar. The frame is also provided with two upright legs 48 which fit against the inside of two diagonally placed ribs 60 of the container. In the embodiment shown each leg 48 consists of an L-shaped angle iron. In this way each leg has a horizontal sectional profile which butts against the rib 60 involved. The horizontal central part 47 of the frame can be detachable fastened, e.g. by means of a schematically shown quick-action coupling 61, to a pallet 62. If the casing is a folding box which is closed at the bottom, the lifting unit can be placed in the box, which is then in turn placed on the pallet 62.

Figure 16:
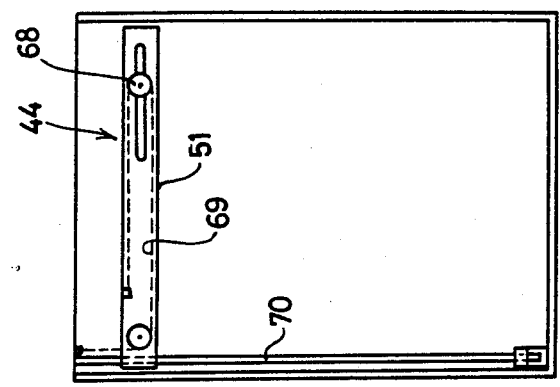
FIG. 16 shows on a smaller scale the supporting device of FIG. 16 in a collapsed state.

The lifting platform 43 is also designed as a supporting bar 51 which extends between the two legs 48 and has hingedly fastened side leaves 52. The supporting bar 51 is connected at one end to the lifting device yet to be described and also mates with the flat-holder also yet to be described. The side leaves 52, which are shown in the flapped-up position in FIG. 16, are not only hingedly connected to the supporting bar 51, but are also each supported by a bracket 53 which ensures a limitation of the hinged movement to the horizontal position.

In the embodiments of the supporting device according to the invention shown in FIGS. 7 to 16 the supporting bar 51 situated between the upright legs 48 of the frame forms the carrier of at least part of both a lifting device 44 and a flat-holder 45, as will be described with reference to FIGS. 17 to 19.

Figure 17:
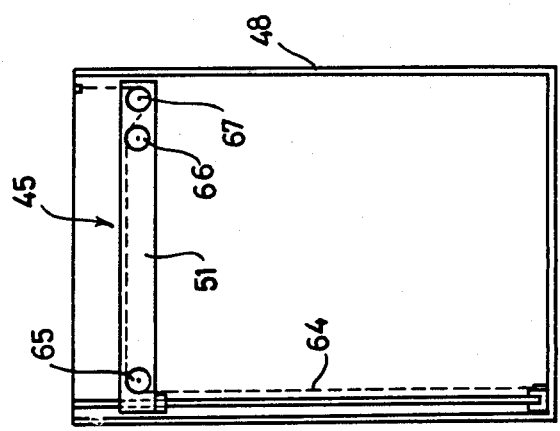
FIG. 17 shows very schematically the "flat-holder" which is used in the supporting device according to the invention.

The "flat-holder" 45 shown in FIG. 17 comprises an inextensible belt or similar cable 64 which is anchored in the central part 47 of the frame (see also FIG. 20), and which is conveyed over three rollers 65–67 of the supporting bar 51. The rollers 65 and 67 have a fixed position in which the belt 64 is conveyed along the top of the roller 65 and along the bottom of the roller 67, while the top end of the belt 64 is fastened to the upright leg 48 of the frame. The roller 66 is displaceable for tensioning of the belt 64. By means of this flat-holder 45, the supporting bar 51 always remains in the absolutely horizontal position during lifting and moving downwards.

The flat-holder 45 is basically the same as the flat-holder used in the embodiments of the supporting device of FIGS. 1 to 6.

The lifting device 44 shown in FIGS. 18 and 19 is designed as an elastically extensible belt 69 conveyed over a number of rollers 68. In the embodiment according to FIG. 18 one end of this belt 69 is connected to an upright rod 70, and the other end is fastened to the supporting bar 51. The right roller 68 in FIG. 18 is displaceable for tensioning of the belt 69, in order in that way to obtain an adaptation to the weight of the products to be placed on the lifting platform 43. On the left side in FIG. 18 the supporting bar 51 is conveyed along the rod 70.

Figure 19B:
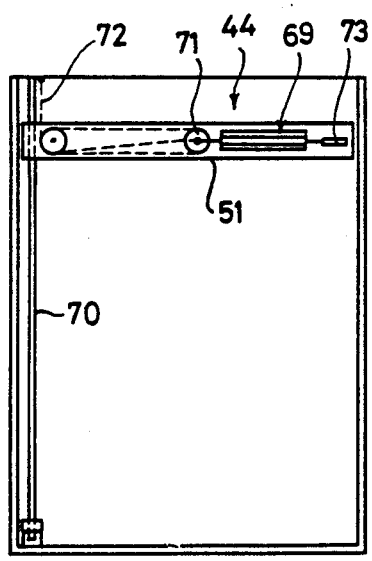

A variant of the lifting device according to FIG. 18 is shown in FIGS 19A and 19B. Here the elastically extensible belt 69 is not directly, but indirectly, connected to the rod 70 by means of the pulley block 71. The cable 72 used in the lifting device is fastened by one end of the top end of the rod 70 and by the other end to the pulley block 71. The belt 69 in this case consists of a number of short belts which are connected by one end to the pulley block 71 and by the other end by means of a tensioning element 73 to the supporting bar 51. Also in this embodiment the rod 70 acts as a guide for the bar 51. It can be seen clearly from FIG. 19A that the supporting bar 51 is provided on one side with the lifting device 44 (corresponding to FIG. 19B) and on the other side with the flat-holder 45 (as in FIG. 17).

The lifting device of FIGS. 18 and 19 could also be used in the embodiments of the supporting device of FIGS. 1 to 6.

Figure 20:
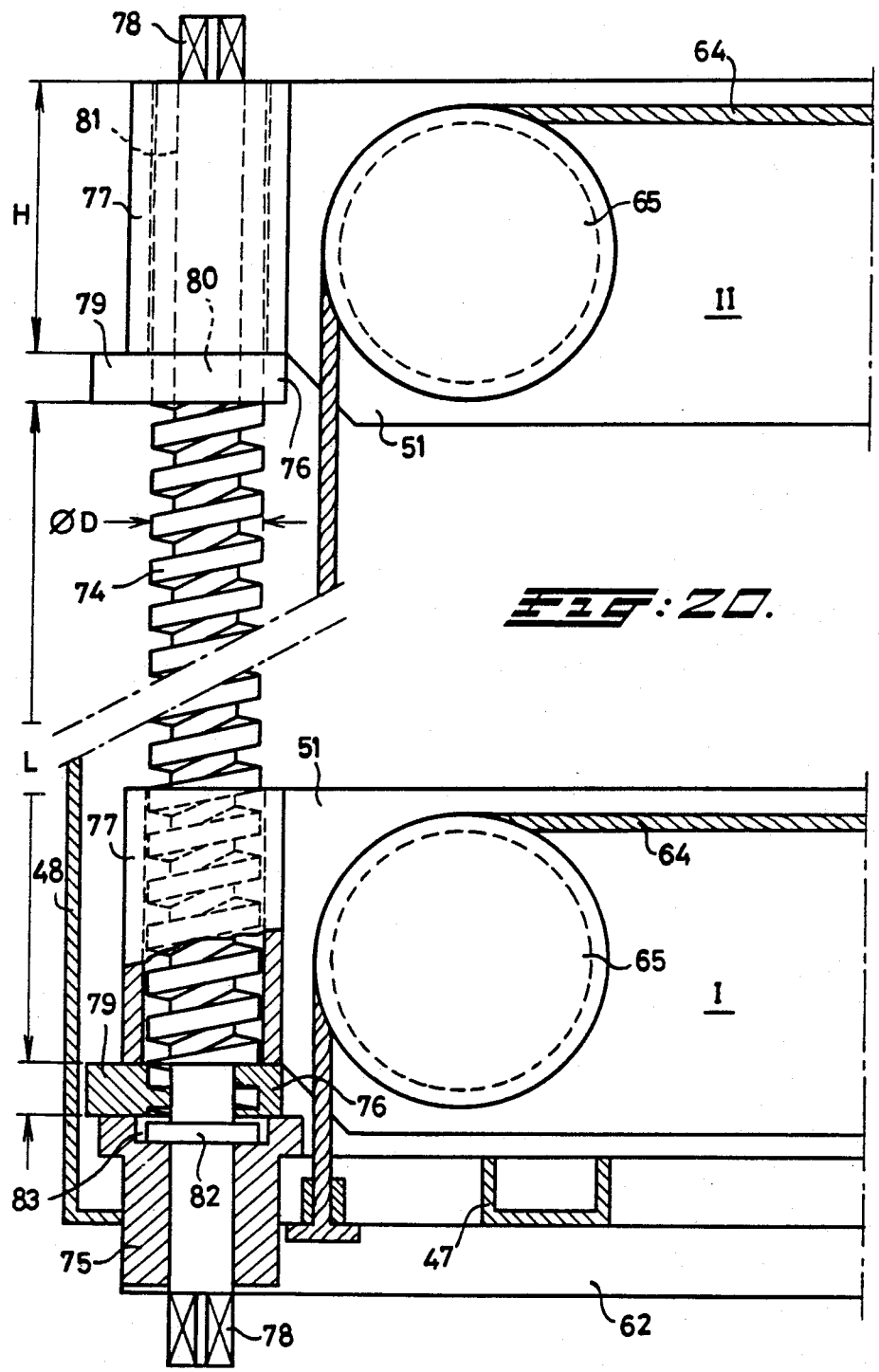
FIG. 20 is a view on an enlarged scale of a lifting device with a threaded rod.

In the embodiment according to FIG. 20 the lifting device 44 consists of a threaded rod 74 which is set up near one of the legs 48 of the frame. The threaded rod 74 is rotatably supported on a bush 75 which is fastened in the centre part 47 of the frame. The threaded rod 74 mates with a nut 76 which has about two windings of a complementary screw thread. The supporting bar 51 rests on this nut 76. The supporting 51 is to that end connected (welded) to a socket 77. This socket has a smooth inside and can therefore move freely over the threaded rod 74. In the embodiment according to FIG. 20 the threaded rod 74 is provided on both ends with a coupling piece 78, in this case a square to mate with a drive element (not shown) outside the frame, such as, e.g. a cranked handle or motor-driven socket.

Figure 21A:
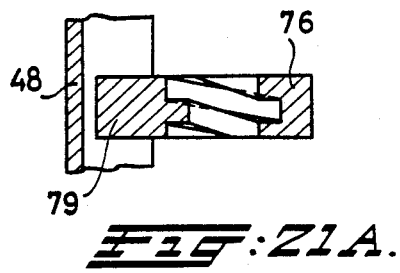
FIGS. 21A and 21B are a side and top view respectively of a detail from the device according to FIG. 20.
Figure 21B:
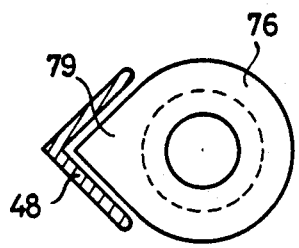

The socket 77 has a height H of at least four times the diameter D of the threaded rod 74. The screw thread windings in the threaded rod extend from the bottom side of the socket 77 in its lowest position I to the bottom side of the socket in the top position II. As can be seen in FIG. 21B, the nut 76 is designed as a loose ring which is provided on the outside with a pointed projection 79 which fits with play into the inside of the profile of the adjacent leg 48 of the frame.

At the top end the threaded rod 74 connecting to the screw thread windings is first designed with a short smooth core part 80 and above it a smooth guide part 81 the full diameter D of the rod. In the embodiment according to FIG. 20 a coupling piece 78 is provided above that.

In the two end positions I and II the screw thread windings of the rod 74 come free from the nut 76.

If the threaded rod 74 continues to turn after the supporting bar 51 has reached its lowest position I, the supporting bar is moved upwards a little until the screw thread comes free from the nut 76 below it. The threaded rod 74 is provided with a collar 82 which lies with some play in a space 83 in the top of the bush 75. When the top position II of the supporting bar 51 is reached, the nut 76 comes free itself from the screw thread ending there on further turning of the threaded rod 74. If the direction of turning is reversed, the engagement of the screw thread of the rod 74 with the nut 76 is restored automatically, both in position I and in position II, so that the intended lifting movement or downward movement of the supporting bar 51 and therefore of the lifting platform 43 begins.

Figure 22:
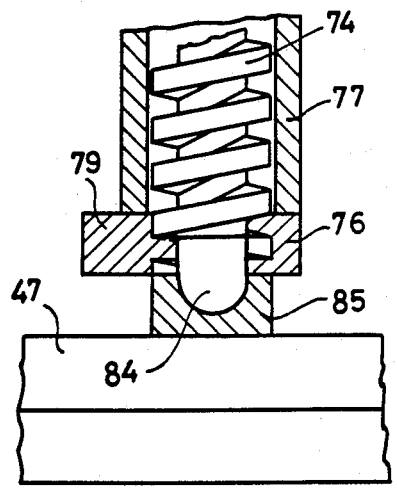
FIG. 22 is a variant of a detail from FIG. 20.

In the variant according to FIG. 22 the threaded rod 74 does not extend through the central part 47 of the frame, but the rod 74 rests with a spherical end 84 in a correspondingly shaped pivot bearing 85. In that case the threaded rod 74 has only one coupling piece 78 at the top end.

The above-described supporting device is simple in design and can easily be placed in a casing forming a container. When collapsed, the supporting device takes up little space and can thereby be returned simply to the factory for re-use.

The present invention is not limited to the embodiments shown in the example. For instance, instead of a threaded rod, a different type of lifting device can be used. Nor is it necessary for the guide rod to be connected to the supporting bar. It is possible for the guide rod to be placed separately in the container and the supporting bar to be supported against the guide rod by means of a supporting wheel disposed on the end of the supporting bar near the guide rod.

What is claimed is:

1. A supporting device for supporting a vertically adjustable lifting platform in a container for the transportation, temporary storage and display and presentation of products such as packed foods, the lifting platform being adapted for carrying the products, said supporting device comprising:
   a supporting bar for directly supporting a vertically adjustable lifting platform in a container, said lifting platform being adapted for carrying products thereon;
   a lifting device cooperating with said supporting bar for effecting vertical displacement of said supporting bar when said support device is in said container;
   a hinge means connecting said supporting bar to said lifting device such that said supporting bar and lifting device are foldable against one another; and
   said supporting device forming a separate, foldable unit that fits inside a casing formed by the container.

2. The device of claim 1, which is further characterized in that it comprises a base member and the base member, the lifting platform and the lifting device are combined to one lifting unit.

3. The device of claim 2, wherein the lifting platform is designed so that it is folding or collapsible.

4. The device of claim 2, wherein the base member forms part of a base of the supporting device, the base being designed so that it is folding or collapsible.

5. The supporting device of claim 1, wherein the supporting bar is provided at one end with a first end part which is hingedly connected to the supporting bar and mates with the lifting device for the displacement of the supporting bar relative to the lifting device.

6. The supporting device of claim 5, wherein the supporting bar is provided at the other end with a second end part which is hingedly connected to the supporting bar and slidably connected to a guide rod for guiding and supporting the supporting bar at said other end and being disposed parallel to the direction of displacement of the supporting bar.

7. The supporting device of claim 5, wherein the lifting device comprises a threaded rod and the first end part of the supporting bar is provided with a screw-threaded part accommodating the threaded rod, such that upon rotation of the threaded rod the supporting bar is displaced relative to the threaded rod, and wherein the supporting bar is provided at the other end with a second end part which is hingedly connected to the remaining part of the supporting bar and provided with a through hole through which extends a guide rod for guiding and supporting the supporting bar at said other end, said guide rod being disposed parallel to the threaded rod and being slidable relative to the second end part, the threaded rod and the guide rod each being provided at their ends with end plates which are disposed essentially at right angles to the axis of the rod, and which are adapted to rest sideways against the inside of upright walls of the container, when the supporting device is placed therein, each end plate having an outer periphery with a shape adapted to the shape of the part of the inside wall of the container against which the end plate comes to rest.

8. The supporting device of claim 5, wherein the lifting device comprises a threaded rod and the first hinged end part of the supporting bar is provided with a screw-threaded part accommodating the threaded rod, such that upon rotation of the threaded rod the supporting bar is displaced relative to the threaded rod, and wherein the supporting bar is provided at the other end with a second part which is hingedly connected to the remaining part of the supporting bar and provided with a through hole through which extends a guide rod for guiding and supporting the supporting bar at said other end, said guide rod being disposed parallel to the threaded rod and being slidable relative to the second end part, the ends of the threaded rod and guide rod which are intended for placing on the bottom of the container, when the supporting device is placed therein, being coupled to the end parts of an oblong-shaped bottom plate adapted to rest on the bottom of the container, when the supporting device is placed therein, and having a length essentially corresponding to the length of the supporting bar, both lengths preferably being adjustable.

9. The supporting device of claim 8, wherein one of the end parts of the bottom plate and is hingedly connected to the remainder of the bottom plate and coupled to the matching end of either the threaded rod or the guide rod, and the other end part of the bottom plate is detachably coupled to the matching end of the guide rod or the threaded rod, respectively.

10. The supporting device of claim 1, wherein the length of the supporting bar is adjustable.

11. The supporting device of claim 1, further comprising a leveling device for keeping the supporting bar always in a horizontal position, when the supporting device is placed inside the container, the supporting bar forming the carrier of the least part of the leveling device 12. A combination comprising: a casing forming a container for the transportation, temporary storage and display and presentation of products such as packed foods; a supporting device for supporting a vertically adjustable lifting platform in the container, the lifting platform being adapted for carrying the products, said supporting device being designed as a separate and folding or collapsible unit and being placed inside the casing, said supporting device comprising a supporting bar for directly supporting the lifting platform; a lifting device cooperating with the supporting bar for the vertical displacement thereof; and a hinge means for connecting said supporting bar to the lifting device in such a way that the supporting bar and the lifting device can be folded against each other when the supporting device is outside the container.

13. The combination of claim 12, wherein the supporting device is provided with a base and the casing rests with it bottom end on said base.

* * * * *